United States Patent Office 2,995,514
Patented Aug. 8, 1961

---

2,995,514
OIL BASE DRILLING FLUIDS
John W. Jordan and Richard E. Offeman, Houston, and Donald J. Weintritt, Bellaire, Tex., assignors to National Lead Company, New York, N.Y., a corporation of New Jersey
No Drawing. Filed Apr. 29, 1957, Ser. No. 655,475
6 Claims. (Cl. 252—8.5)

This invention relates to drilling fluids, particularly oil-base drilling fluids as used in the rotary method of drilling oil and gas wells. More particularly this invention relates to a new oil-base drilling fluid composition which displays improved viscosity characteristics within the temperature range normally encountered in drilling operations.

Most drilling fluids are mixtures of water and various solid materials and have been commonly referred to as water-base drilling fluids. Under some drilling conditions it has been found that water-base drilling fluids have several disadvantages, particularly their tendency to lose water to the formation. This loss of water may result in so-called "water blocking" of formation pores and also may cause any clay in the formation adjacent to the bore hole to hydrate and thus reduce the permeability of the formation to oil flow. One attempted solution of some of these difficulties has been the use of an oil-base drilling fluid, in which oil is substituted for the water phase, with the expectation that the loss of small amounts of oil to the formation surrounding the bore hole will have no injurious effect upon the well's productivity. However, to date, there have been no completely satisfactory oil-base drilling fluids, the presently known compositions leaving much to be desired.

Some of the more successful compositions have contained asphalt as the primary viscosity-imparting and bodying agent for the oil. Other formulations have relied upon soaps and other organic compounds of high molecular weight, used either by themselves or in combination with a finely-divided clay to impart to the oil the necessary viscosity and gel structure. All of these formulations have the disadvantage of displaying relatively poor viscosity characteristics when subjected to the high temperature frequently encountered in drilling operations. Most of these compositions have the further disadvantage of being unable to suspend weighting materials because of their reduction in viscosity and lack of gel strength at elevated temperatures; this, in turn, may result in considerably higher fluid loss. Those compositions containing asphalt have a still further disadvantage in that the asphalt generally tends to degrade into soluble constituents upon prolonged contact with oil, particularly at elevated temperatures, making it necessary to add additional bodying agent from time to time while the fluid is being used.

It is an object of this invention to provide an improved oil-base drilling fluid.

Another object of this invention is to provide an improved oil-base drilling fluid displaying more nearly constant viscosity characteristics than oil-base drilling fluids previously known.

Another object of this invention is to provide an oil-base drilling fluid with superior weight-suspending properties at elevated temperatures, such a fluid being particularly useful as an oil-base workover fluid.

A further object of this invention is to provide an oil-base drilling fluid concentrate which can be readily dispersed in oil to produce an oil-base drilling fluid having improved viscosity and weight suspending characteristics.

In its broadest concept the instant invention relates to an oil-base drilling fluid comprising (a) mineral oil, (b) asbestos, and (c) a surface-active agent of the type to be described. In addition, various additives as are known to the drilling mud art may be introduced to impart particular properties depending upon the specific application.

The preferred embodiment of the present invention comprises a mixture of crude oil in which a suitable amount of a surface-active agent of the type described has been dispersed and to which is then introduced a suitable amount of fine particle size chrysotile asbestos and, where desired, a suitable amount of a fluid-loss reducing additive, this mixture then being thoroughly mixed to insure uniformity before being used as an oil-base drilling fluid; or alternately a concentrate can be prepared in which asbestos, a surface-active agent and, where desired, a fluid-loss reducing material are combined to give a dry fibrous powder which can then be incorporated with oil to produce an oil-base drilling fluid.

A particularly useful application of the present invention is in the preparation of oil-base workover fluids. Such fluids are used when it is desired to re-enter a well which has been abandoned or whose production has been partially depleted, or to deepen a well without harming existing production. The workover operation amounts to cleaning out the bore hole of sand and other contaminants that have entered the well and tend to block the flow of oil into the hole.

Another useful application of this invention is in the treating of fracturing oils to give them increased suspending properties. The ability of a fracturing fluid to suspend additional sand and other siliceous materials is an important characteristic when it is desired to clean out the bore hole after a fracturing operation.

The increased weight-suspending properties which are imparted to an oil-base fluid through the practice of this invention can also be advantageously applied to oil-base packer fluids. Packer fluids are used to fill the area between the tubing and casing upon completion of the well. In areas where high formation pressures are encountered, it is frequently necessary to load up the packer fluid with large amounts of weighting material which tend to settle badly when the fluid is in a static condition.

Oil-base muds are well known in the art, and do not need especial description here, except to note that this type of drilling fluid or mud has oil as its continuous phase. Water may also be present, and when this is the case, the water is in the form of a water-in-oil emulsion, and generally constitutes a minor percentage of the fluid by volume. The oil is generally a petroleum oil, often a crude oil, frequently topped to remove its most volatile constituents, and thereby lower its flash point; or the oil may be a refined or partially refined product, such as fuel oil, diesel oil, kerosene, stove oil, and the like. Crude oil having an API gravity of between 22 and 28 has been found satisfactory. The oil-base fluid may contain mineral additives, such as calcium carbonate, ground barite, iron oxide, asphalt, gilsonite, and other ingredients common in this art.

The asbestos which we use is any mineral of the asbestos group, which specifically comprises actinolite, anthophyllite, amosite, chrysotile, crocidolite, and tremolite, and where the word "asbestos" is used in the claims, it is to be understood as any member of this naturally occurring and well-defined group. All of these minerals have a pronounced fibrous structure, which is generally readily visible to the unaided eye, although in some varieties inspection under a hand lens of 5 or 10 power is necessary to observe the fibrous structure. We use the asbestos in a comminuted state, most generally ground so as to pass a 30-mesh screen, although still finer grinding is in many cases useful. The asbestos cloth weaving industry provides a preferred and readily available source of material in the form of the so-called "shorts," which are too small for weaving purposes. This asbestos is generally of the chrysotile variety.

The surface-active agent which we use is characterised by its possession of a long hydrocarbon group, such as an alkyl group of 9 or more carbon atoms in length, an abietic group, a so-called "keryl" radical as obtained from kerosene, or the like, attached to a hydrophilic group which may be carboxyl, sulfate, sulfonate, polyoxyethylene, or a cationic group, such as an ammonium or quaternary ammonium group. A discussion of hydrophobic groups of the type described is contained on pages 17–19 of the book "Surface Active Agents" by Schwartz and Perry, New York, 1949.

Where the surface-active agent contains a carboxyl or sulfate radical, this will generally be neutralized with an alkali metal or alkaline earth metal cation or a short chain amine or alkanol amine, such as sodium, potassium, calcium, magnesium, methylammonium, or triethanolammonium. Where the surface-active agent is of the cationic type, it will generally be used in salt form, the anion being derived from a mineral acid or a simple organic acid, such as acetic or propionic acid. Thus, the cationic surface-active agents will be in the form of their chloride, nitrate, sulfate, acetate, and the like salts.

Surface-active agents which are useful include, by way of example but not by way of limitation, ordinary fatty acid soaps, such as sodium, potassium, calcium, and trimethylammonium laurates, oleates, palmitates, stearates, and the like. Rosin soaps are likewise useful, being derived by the simple saponification of rosin with an alkali. A useful rosin soap is sodium rosinate or more properly termed sodium abietate. In the examples which follow, "rosin soap" refers to the simple sodium soap of rosin. The best soap which we have found for general use is tall oil soap, preferably the sodium soap. Tall oil, as is well known, is a mixture of rosin acids, chiefly abietic acid, and fatty acids, chiefly unsaturated 18-carbon atom acids such as oleic and linoleic acids, the rosin acids and the fatty acids in roughly equal proportions, with a small amount, 5 to 10 percent, of high alcohols and related compounds. It is widely available at a low price. Where tall oil soap is mentioned in the examples without further particularisation, the sodium soap is to be understood.

Another effective surface-active agent is any member of the class of so-called sulfonated fatty acids in their soap form. These are actually half sulfate esters; they are described in some detail in the book by Schwartz and Perry hereinabove recited, on pages 45 to 51. We have found the sodium salt of sulfated castor oil, commonly known as sulfonated castor oil, and designated herein as sodium sulforicinoleate, to be particularly effective. Alkaline earth metal soaps thereof are likewise readily available and effective.

A widely available sub-group of surface-active agents consists of long chain alkyl ethers of polyethylene glycol. The carbon chain should have at least 9 carbon atoms and may be directly attached to the polyethylene glycol or attached by means of an intermediate phenyl group. One such compound which we have found especially effective is nonylphenyl ether of polyethylene glycol, this being the monoether, and the polyethylene chain being comprised of 9 ethyoxy groups; the formula is $$C_9H_{19}C_6H_4O(CH_2CH_2O)_9H$$

and it is commercially available from the Carbide and Carbon Chemicals Company as "Tergitol NPX."

As has been indicated, long chain cationic surface-active agents are likewise very useful in our invention. For example, lauryl ammonium acetate, dioctadecyldimethylammonium chloride, octadecyltrimethylammonium bromide, abietyl ammonium acetate, and the like, may be used with success. In an example which follows, an alkylbenzyltrimethyl ammonium chloride is used; in this compound, obtainable commercially as "Algicide ATM–50," the alkyl group is derived from kerosene and may be called a keryl group. Keryl benzyl derivatives are defined and described on pages 122–123 of the book by Schwartz and Perry cited.

It will be apparent that a well-recognized and precisely defined class of surface-active agents has been described, and where the term "surface-active agents of the type described" appears in the claims it is to be understood as referring to a member of the group which has been described, defined, and exemplified hereinabove and in the examples which follow.

We have found the presence of a surface-active agent of the type described necessary for the proper operation of our invention. In some cases we have gotten good results when the surface-active agent was present to the extent of only one-fifth of the weight of asbestos used. On the basis of our experiments, we may set a lower limit for the proportion of surface-active agents as about one-sixth that of the asbestos by weight. On the other hand, a greater relative proportion of surface-active agent is not harmful, and indeed confers additional benefits, such as the ready emulsification of any water which may inadvertently or deliberately be admixed with the oil-base drilling fluid. As some of the examples which follow show, we have gotten excellent results when the surface-active agent was present in an amount equal to the weight of the asbestos used. The upper limit for the proportion of surface-active agent may be set primarily on economic grounds, and when a particularly inexpensive surface-active agent is used, as much as twice the weight of the asbestos may be used.

In the operation of our invention, the asbestos may be looked upon as a primary constituent, aided, activated, and made effective in accordance with the invention by the presence of the secondary constituent, the surface-active agent. In compounding a drilling fluid in accordance with the invention, therefore, the amount of asbestos to be used will generally be decided upon first, and the amount of surface-active agent then decided upon in accordance therewith. Some of the advantages of the invention will become substantially manifest with as little as 5 lbs. of asbestos per barrel of drilling fluid, the standard oil field barrel of 42 U.S. gallons being understood.

There is no particular upper limit to the amount of asbestos, but it will be understood that as increasing amounts are used, the fluid will become thicker and thicker. A detailed example which follows shows as much as 25 lbs. per barrel of asbestos in the composition, this particular fluid having a viscosity at 80° F. of 285 centipoises. This could be used either as a drilling fluid or as a packer fluid. It will be understood that the term "oil-base drilling fluid" as used in the claims contemplates also quite thick fluids of the type which would be used for packing behind a casing; for this usage as much as 50 lbs. of asbestos per barrel can be used to good advantage.

Various additional materials which may be incorporated into the oil-base drilling fluid compositions prepared according to the teachings of this invention include such commercially available fluid-loss reducing additives as gilsonite and rubber-coated barite. Gilsonite is a naturally occurring asphaltic mineral whose use in drilling muds is described in United States Patent No. 2,597,085. Rubber-coated barite is available commercially under the trade name "Rubarite," from Rubarite, Inc., of Tulsa, Oklahoma. Its preparation and composition are described in United States Patent No. 2,700,655.

Any order of addition of the ingredients may be used. Where the fluid is to be mixed at the well-site, the various additives can be introduced into the oil vehicle through the cone and jet mixers common in drilling mud systems. Mixing can be performed in a tank, for example at the rig, using propeller type agitators, if desired.

The problems involved in transporting a large volume of ready-mixed oil-base drilling fluids to a remotely located drilling site may frequently be quite complex and economically prohibitive. It is, therefore, a distinct advantage as one embodiment of our invention to prepare an oil-base concentrate following the teachings of this specification which can be readily mixed with oil at the drilling site. The oil-base concentrate thus prepared is a dry fibrous material containing asbestos, a surface-active agent, and optionally a fluid-loss reducing material.

In preparing an oil-base drilling fluid concentrate in accordance with our invention, the following proportions by weight have been found to be operative: 30–60% of a fibrous silicate material; 10–40% of a surface active agent; and from 0–50% of a fluid loss additive.

The nature of our invention and its application to the drilling mud art can be better understood by referring to the following examples, in which the tests were made in accordance with the American Petroleum Institute Code No. 29:

EXAMPLE I

The change in viscosity with increasing temperature of a typical oil-base fluid prepared according to the present invention was studied. The sample was prepared by adding twenty grams of finely ground chrysotile asbestos to 350 cc. of Pearsall (a Texas field) crude oil, API gravity 25.5, to which had been added 5 grams of rosin soap as a surface-active agent. The viscosity of this sample is compared with that of other formulations in the following table:

EXAMPLE II

The viscosity characteristics of some typical oil-base drilling flud compositions prepared according to this invention and formulated with different surface-active agents were studied over the temperature range most likely to be encountered in a drilling operation. The data thus obtained are summarized in the following table. Each sample contained ten pounds per barrel of chrysotile asbestos dispersed in Three Rivers (a Texas field) crude oil. Fifteen percent water was emulsified in the oil used in preparing these samples in order to evaluate the water compatibility of these drilling compositions, water contamination being one of the most common problems encountered in actual field use of oil-base drilling fluids.

Table 2

| Temp., °F. | Calcium Sulforicinoleate, 2.75 lb./bbl., cp. | Sodium Sulforicinoleate, 2.75 lb./bbl., cp. | Barium Sulforicinoleate, 2.75 lb./bbl., cp. | Calcium Rosinate, 10.0 lb./bbl., cp. | Barium Rosinate, 10.0 lb./bbl., cp. |
|---|---|---|---|---|---|
| 80 | 160 | 104 | 143 | 113 | 116 |
| 100 | 124 | 74 | 100 | 80 | 75 |
| 120 | 98 | 54 | 73 | 61 | 50 |
| 140 | 80 | 36 | 55 | 40 | 35 |
| 160 | 70 | 27 | 44 | 32 | 30 |
| 180 | 63 | 22 | 38 | 24 | 20 |

Although the use of the salts of sulfonated ricinoleic acid has been found to be very efficient on a pound-for-pound basis, rosin and tall oil soaps which give highly satisfactory results are readily available and economical. The cost and availability of these last mentioned materials cause them to be among the preferred surface-active agents for the practice of this invention.

EXAMPLE III

An oil-base fluid was prepared from Three Rivers crude oil which had dispersed therein 1.75 pounds per barrel of alkyl phenyl ether of polyethylene glycol (available from Carbide and Carbon Chemical Company under the trade name of "Tergitol NPX). Seven pounds per barrel of chrystotile asbestos was added to this oil and mixed for 15 minutes on a Hamilton Beach mixer. The resulting oil-base fluid had a viscosity of 37 cp. at room temperature and was relatively unaffected by water contamination.

Table 1

| Temperature, °F. | Blank Pearsall Crude, cp. | Ratio of visc. at 80° F. to Visc. at Selected Temperatures | Pearsall Crude+ Asbestos, 20 lb./bbl. cp. | Ratio of Visc. at 80° F. to Visc. at Selected Temperatures | Pearsall Crude+ Rosin Soap, 5 lb./bbl., cp. | Ratio of Visc. at 80° F. to Visc. at Selected Temperatures | Pearsall Crude+ 20 lb./bbl. Asbestos and 5 lb./bbl. Rosin Soap, cp. | Ratio of Visc. at 80° F. to Visc. at Selected Temperatures |
|---|---|---|---|---|---|---|---|---|
| 80 | 47 | 1.00 | 62 | 1.00 | 62 | 1.00 | 174 | 1.00 |
| 100 | 24 | 1.96 | 47 | 1.32 | 30 | 2.06 | 153 | 1.14 |
| 120 | 13 | 3.61 | 24 | 2.58 | 17 | 3.65 | 131 | 1.33 |
| 140 | 8 | 5.88 | 16 | 3.87 | 10 | 6.20 | 110 | 1.58 |
| 160 | 6 | 7.84 | 10 | 6.20 | 6 | 10.32 | 90 | 1.93 |
| 180 | 4 | 11.75 | 6 | 10.33 | 4 | 15.50 | 68 | 2.56 |

A consideration of these data shows the more constant viscosity which is achieved by the incorporation of both asbestos and a surface-active agent in the oil. Although there is some change in viscosity with temperature shown for our recommended formulation, it is percentagewise a much smaller change than obtained with the comparative compositions. Even more important, the viscosity obtained at 180° F. is still quite satisfactory for drilling operations which is not the case with other formulations evaluated.

EXAMPLE IV

The physical properties of several additional drilling mud formulations prepared in accordance with the teachings of this invention were evaluated. The composition of these formulations and their physical properties are summarized in the following table. Al samples were weighted with barite; all proportions are expressed in terms of pounds per barrel of completed oil-base mud. The asbestos was of the chrysotile variety.

Table 3

| Sample | Oil | Surface Active Agent and Bodying Agent | Fluid Control Agent | Mud Wt., lb./gal. | Fluid Loss, API, cc. at 180° F. | Viscosity, cp. (80° F.) | Suspension Properties After 16 hr. Hot Rolling |
|---|---|---|---|---|---|---|---|
| 1 | Three Rivers crude | 6.5 tall oil soap, 10.0 asbestos | 3.0 Rubarite | 9 | 1.8 | 115 | Slight soft sediment. |
| 2 | ___do___ | 12.5 rosin soap, 15.0 asbestos | 3.5 Rubarite | 9 | 1.0 | 106 | Slight sediment. |
| 3 | ___do___ | 2.75 sodium sulforicinoleate, 10.0 asbestos | ___do___ | 9 | 9.2 | 93 | Very slight soft sediment. |
| 4 | ___do___ | 10.0 rosin soap, 25.0 asbestos | 20 gilsonite, 5 Rubarite | 10 | 0.0 | 285 | Do. |
| 5 | Pearsall crude | 3.5 rosin soap, 10.0 asbestos | 50 gilsonite | 10 | 2.4 | 375 | Very slight sediment. |
| 6 | ___do___ | 5 rosin soap, 15 asbestos | 20 gilsonite, 5 Rubarite | 10 | 0.3 | 405 | Very slight soft sediment. |
| 7 | 60% Bunker "C" fuel oil; 40% diesel oil. | 5 tall oil soap, 20 asbestos | None | 10 | 12.5 | 148 | Slight soft sediment. |
| 8 | 70% residuals, 30% stove oil. | 3 sodium sulforicinoleate, 15 asbestos. | 7.5 Rubarite | 10.7 | 2.2 | 212 | Do. |
| 9 | ___do___ | 3 sodium sulforicinoleate, 10 asbestos. | ___do___ | 10.7 | 1.0 | 150 | Do. |

The performance of these muds will be more fully appreciated by comparing them with two commercially available oil-base drilling fluids that were evaluated under the same experimental conditions.

Table 4

| | Mud Weight, lbs./gal. | Viscosity, cp. (80° F.) | Suspension Properties After 16 hrs. Hot Rolling |
|---|---|---|---|
| Commercial Sample #1 | 10.0 | 285 | Hard cake sediment. |
| Commercial Sample #2 | 11.6 | 230 | Thick soft sediment. |

A study of the above tables shows that the oil-base drilling fluids prepared in accordance with the teachings of this invention have in general very desirable physical properties and unusually good weight suspending properties.

EXAMPLE V

The effect of water contamination upon oil-base drilling fluids containing asbestos and asbestos plus a surface active agent was studied. These samples were prepared from Bunker "C" fuel oil by admixing with the oil asbestos and the proportions of the surface active agents indicated in the following table. This mixture was stirred on a Hamilton Beach mixer for 15 minutes. The weighting material was then introduced and the samples stirred for 10 additional minutes. The muds were then subjected to water contamination, stirred for 10 more minutes and rolled for 16 hrs. at 150° F. All proportions are expressed in pounds per barrel unless otherwise indicated. The asbestos was of the chrysotile variety.

Table 5

| Sample | Oil blank | 1 | 2 | 3 | 4 | 5 |
|---|---|---|---|---|---|---|
| Asbestos | | 20 | 20 | 20 | 20 | 20 |
| Tall oil soap | | | 5 | 5 | 5 | 5 |
| Calcium hydroxide | | | | 5 | 5 | |
| Rubarite | | | | | | 3 |
| Barite (finely ground) | | 93.4 | 93.4 | 93.4 | 93.4 | 93.4 |
| Water, Percent | | | 10 | 10 | 10 | 10 |

Table 5—Continued
PROPERTIES AFTER ROLLING 16 HRS. AT 150° F.

| Fluid loss, API, cc | 100 | 12.0 | 61.0 | 6.0 | 5.0 | 4.4 |
|---|---|---|---|---|---|---|
| Temp.—visc. | °F. / Cp. | °F. / Cp. | °F. / Cp. | °F. / Cp. | °F. / Cp. | °F. / Cp. |
| | 80 / 137 | 73 / 620 | 79 / 470 | 80 / 620 | 79 / 570 | 82 / 620 |
| | 102 / 61 | 149 / 94 | 100 / 250 | 102 / 230 | 104 / 295 | 108 / 295 |
| | 118 / 35 | 177 / 59 | 120 / 170 | 120 / 166 | 123 / 195 | 120 / 209 |
| | 133 / 22 | | 132 / 133 | 130 / 132 | 130 / 170 | 130 / 180 |
| | 154 / 14 | | 151 / 105 | 146 / 97 | 143 / 135 | 145 / 145 |
| | 185 / 9 | | | 162 / 74 | 155 / 116 | |
| Settling, 30 min., 150° F | | None | Heavy | None | None | None |

These data further illustrate the lack of utility of asbestos without a surface active agent.

EXAMPLE VI

The bodying effects of some additional fibrous silicate materials in oil both with and without surface-active agents were studied. The results obtained with two such materials are summarized in the following table. All proportions are expressed in terms of pounds per barrel.

Table 6

| Sample | Oil | Fibrous Silicate Material | Surfactant | Viscosity, cp. (80° F.) |
|---|---|---|---|---|
| 1 (blank) | Pearsall crude | | | 48 |
| 2 | ___do___ | 7-Amosite | | 90 |
| 3 | ___do___ | ___do___ | 1.75-kerylbenzyl [1] trimethylammonium chloride | 150 |
| 4 | ___do___ | 7-Crocidolite | | 100 |
| 5 | ___do___ | ___do___ | 1.75-kerylbenzyl trimethylammonium chloride | 190 |
| 6 (blank) | Three Rivers crude | | | 18 |
| 7 | ___do___ | 7-Amosite | | 100 |
| 8 | ___do___ | ___do___ | 1.75-kerylbenzyl trimethylammonium chloride | 190 |

[1] Available commercially from Oronite Chemical Company under the trade name "Algicide ATM-50."

EXAMPLE VII

An oil-base concentrate was prepared by thoroughly mixing 50 grams of chrysotile asbestos, 10 grams of rosin soap, 10 grams of Rubarite and 40 grams of gilsonite. The resulting dry fibrous concentrate was then available for incorporation in oil to produce an oil-base drilling fluid. The amount of this concentrate which should be used per barrel of oil depends upon the physical properties desired in the finished drilling fluid and can best be determined by pilot testing in each oil. We have however, found that from 10 to 30 pounds of concentrate per barrel of oil produces a satisfactory drilling fluid in most oils.

The dry fibrous concentrate described above was incorporated in two commercially available oils by mixing on a Hamilton Beach mixer for 15 minutes. The properties of the resulting oil-base drilling fluid are summarized in the following table:

Table 7

| Sample | Oil | Visc., cp. (90° F.) | Concentrate, lb./bbl. | Initial Properties | | | Properties after Rolling 16 hrs. at 150° F. | | |
|---|---|---|---|---|---|---|---|---|---|
| | | | | Visc., cp. (90° F.) | API Filter Loss | Settling | Visc., cp. (90° F.) | API Filter Loss | Settling |
| 1 | Industrial fuel oil obtained from Phillips Petroleum Co. | 85 | 10 | 181 | 0.0 | None | 151 | 0.0 | None. |
| 2 | ___do___ | 85 | 15 | 275 | 0.0 | ___do___ | 233 | 0.0 | Do. |
| 3 | ___do___ | 85 | 20 | 278 | 0.0 | ___do___ | 350 | 0.0 | Do. |
| 4 | No. 5 fuel oil obtained from Uinta Oil Refining Co. cut with 10% diesel oil. | 80 | 10 | 176 | 0.0 | ___do___ | 300 | 0.0 | Do. |

The invention has been described with the use of specific examples, but it is to be understood that the concepts involved are broad, and the description and appended claims are to be interpreted equally broadly.

What we claim is:

1. An oil-base drilling fluid comprising an oil as continuous phase, from 5 to 50 lbs. per barrel of a comminuted asbestos, and a surface-active agent in the proportion of from one-sixth to twice the weight of said asbestos.

2. An oil-base drilling fluid comprising an oil as continuous phase, from 5 to 50 lbs. per barrel of a comminuted asbestos of fineness at least 30-mesh, and a surface-active agent in the proportion of from one-sixth to twice the weight of said asbestos.

3. An oil-base drilling fluid comprising an oil as continuous phase, from 5 to 50 lbs. per barrel of a comminuted asbestos, and a surface-active agent consisting essentially of a long hydrocarbon group chosen from the class consisting of alkyl groups of at least 9 carbon atoms in length, an abietic group, a keryl group, and a keryl benzene group together with a hydrophilic group chosen from the class consisting of carboxyl, sulfate, sulfonate, and polyoxyethylene, in the proportion of from one-sixth to twice the weight of said asbestos.

4. An oil-base drilling fluid comprising an oil as continuous phase, from 5 to 50 lbs. per barrel of a comminuted asbestos of fineness at least 30-mesh, and a surface-active agent consisting essentially of a long hydrocarbon group chosen from the class consisting of alkyl groups of at least 9 carbon atoms in length, an abietic group, a keryl group, and a keryl benzene group together with a hydrophilic group chosen from the class consisting of carboxyl, sulfate, sulfonate, and polyoxyethylene, in the proportion of from one-sixth to twice the weight of said asbestos.

5. An oil-base drilling fluid in accordance with claim 2 in which the asbestos is of the chrysotile variety.

6. An oil-base drilling fluid in accordance with claim 2 in which the surface-active agent is a tall oil soap.

References Cited in the file of this patent

UNITED STATES PATENTS

| | | |
|---|---|---|
| 2,350,154 | Dawson et al. | May 30, 1944 |
| 2,430,039 | Anderson | Nov. 4, 1947 |
| 2,531,812 | Hauser | Nov. 28, 1950 |
| 2,597,085 | Larsen | May 20, 1952 |
| 2,698,833 | Wilson | Jan. 4, 1955 |
| 2,702,787 | Freeland | Feb. 22, 1955 |
| 2,727,001 | Rowe | Dec. 13, 1955 |
| 2,732,343 | Rowe | Jan. 24, 1956 |
| 2,797,196 | Dunn et al. | June 25, 1957 |
| 2,830,948 | Popham | Apr. 15, 1958 |